(12) United States Patent
Yang et al.

(10) Patent No.: US 10,198,131 B2
(45) Date of Patent: Feb. 5, 2019

(54) TOUCH CONTROL DEVICE

(71) Applicant: TPK Touch Solutions (Xiamen) Inc., Xiamen (CN)

(72) Inventors: Hebo Yang, Xiamen (CN); Yuh-Wen Lee, Hsinchu (TW); Yu Zhang, Xiamen (CN); Fu-Yu Su, New Taipei (TW); Liangzhen Xu, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 399 days.

(21) Appl. No.: 15/009,844

(22) Filed: Jan. 29, 2016

(65) Prior Publication Data

US 2016/0224178 A1 Aug. 4, 2016

(30) Foreign Application Priority Data

Feb. 3, 2015 (CN) .......................... 2015 1 0055745

(51) Int. Cl.
*G06F 3/044* (2006.01)
*G06K 9/00* (2006.01)
*G06F 1/16* (2006.01)

(52) U.S. Cl.
CPC ............ *G06F 3/044* (2013.01); *G06F 1/1684* (2013.01); *G06K 9/00013* (2013.01)

(58) Field of Classification Search
None
See application file for complete search history.

(56) References Cited

U.S. PATENT DOCUMENTS

| 9,886,613 | B2 * | 2/2018 | Pi ......................... G06K 9/0002 |
| 2015/0146944 | A1 * | 5/2015 | Pi ........................ H04L 63/0861 |
| | | | 382/124 |
| 2015/0251393 | A1 * | 9/2015 | Kanna ..................... G06F 3/044 |
| | | | 428/334 |
| 2016/0224178 | A1 * | 8/2016 | Yang .................. G06K 9/00013 |

* cited by examiner

*Primary Examiner* — Amare Mengistu
*Assistant Examiner* — Shawna Stepp Jones
(74) *Attorney, Agent, or Firm* — Cooper Legal Group, LLC

(57) ABSTRACT

A touch control device includes a cover lens, a groove, a fingerprint, and a touch sensing structure. The cover lens has a first surface and a second surface opposite to the first surface, in which the first surface is a touch surface. The groove is disposed on the second surface and has a top surface and a side surface adjacent to the top surface, in which an angle between the top surface and the side surface is greater than 90°. The fingerprint recognition structure is at least partially disposed on the top surface of the groove. The touch sensing structure is disposed on the second surface.

12 Claims, 12 Drawing Sheets

TOUCH CONTROL DEVICE

CROSS REFERENCE TO RELATED APPLICATIONS

This Non-provisional application claims priority under 35 U.S.C. § 119(a) to Chinese Patent Application No. 201510055745.2 filed in the People's Republic of China on Feb. 3, 2015, the entire contents of which are hereby incorporated by reference.

BACKGROUND OF THE DISCLOSURE

Field of the Disclosure

The present disclosure relates to a touch control device.

Description of the Related Art

As technology progresses, fingerprint recognition technology is being widely applied to different electronic devices, because fingerprint recognition technology can recognize identities with security. In recent years, fingerprint recognition technology is applied to mobile devices, and it provides excellent security and privacy protection, such that fingerprint recognition technology attracts the public's attention and becomes an important development direction of subsequent similar electronic devices.

In current technologies, the touch control device usually includes a cover lens to provide users an operating surface and to protect the functional components under the cover lens. The fingerprint recognition structure is disposed under the cover lens or further in the groove on the bottom surface of the cover lens. The groove is usually cubic. Because the angle between the top surface and the side surface of the groove is a right angle, the groove is not easily machined, and other components are not easily disposed on the side surface of the groove in the subsequent processes.

SUMMARY OF THE DISCLOSURE

In one aspect of the disclosure, a touch control device is provided. The touch control device includes a cover lens, a groove, a fingerprint, and a touch sensing structure. The cover lens has a first surface and a second surface opposite to the first surface, in which the first surface is a touch surface. The groove is disposed on the second surface and has a top surface and a side surface adjacent to the top surface, in which an angle between the top surface and the side surface is greater than 90°. The fingerprint recognition structure is at least partially disposed on the top surface of the groove. The touch sensing structure is disposed on the second surface.

In some embodiments, the angle between the top surface and the side surface is in a range from 95° to 175°.

In some embodiments, the angle between the top surface and the side surface is in a range from 110° to 165°.

In some embodiments, a surface of the fingerprint recognition structure near the top surface of the groove is a top surface of the fingerprint recognition structure, and a minimum distance between the top surface of the fingerprint recognition structure and the first surface of the cover lens is in a range from 50 μm to 450 μm.

In some embodiments, the minimum distance between the top surface of the fingerprint recognition structure and the first surface of the cover lens is in a range from 80 μm to 400 μm.

In some embodiments, touch control device further includes a mask layer covering the top surface and the side surface of the groove.

In some embodiments, touch control device further includes a first fixing layer disposed between the fingerprint recognition structure and the mask layer covering the top surface of the groove.

In some embodiments, touch control device further includes a second fixing layer disposed between the fingerprint recognition structure and the mask layer covering the side surface of the groove.

In some embodiments, the first fixing layer and the second fixing layer fill the groove.

In some embodiments, the second fixing layer covers the fingerprint recognition structure.

In some embodiments, a thickness of the first fixing layer is in range from 3 μm to 30 μm.

In some embodiments, a thickness of the mask layer equals to or is less than 20 μm.

In some embodiments, the fingerprint recognition structure directly contacts the mask layer covering the top surface of the groove.

In some embodiments, the fingerprint recognition structure is a sensing electrode structure.

In some embodiments, the sensing electrode structure is disposed in the groove and on a part of the second surface.

In some embodiments, the fingerprint recognition structure is an integrated circuit chip.

In some embodiments, the touch sensing structure is a touch sensing electrode structure formed on the cover lens.

In some embodiments, the cover lens further has a side surface connected to the first surface and the second surface. The touch control device further includes a buffer layer disposed on the side surface connected to the first surface and the second surface.

In some embodiments, a maximum distance between the side surface of the cover lens and an outer surface of the buffer layer is in range from 0.03 mm to 0.2 mm.

In the touch control device, by disposing the groove in the cover lens and disposing the fingerprint recognition structure in the groove, the distance between the fingerprint recognition structure and the touch object such as a finger can be reduced. At the same time, except the groove, appropriate thickness of the cover lens is maintained, such that the sensitivity and accuracy of the fingerprint recognition structure and the strength of the cover lens are all ensured. In addition, because the angle between the side surface and the top surface of the groove is greater than 90°, the groove is more easy to be machined, and other components are more easy to be formed on the side surface of the groove, such that the yield of the touch control device is enhanced.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION OF THE DISCLOSURE

In the following detailed description, for purposes of explanation, numerous specific details are set forth in order to provide a thorough understanding of the disclosed embodiments. It will be apparent, however, that some embodiments may be practiced without these specific details. In other instances, well-known structures and devices are schematically depicted in order to simplify the drawings.

Figure 1:
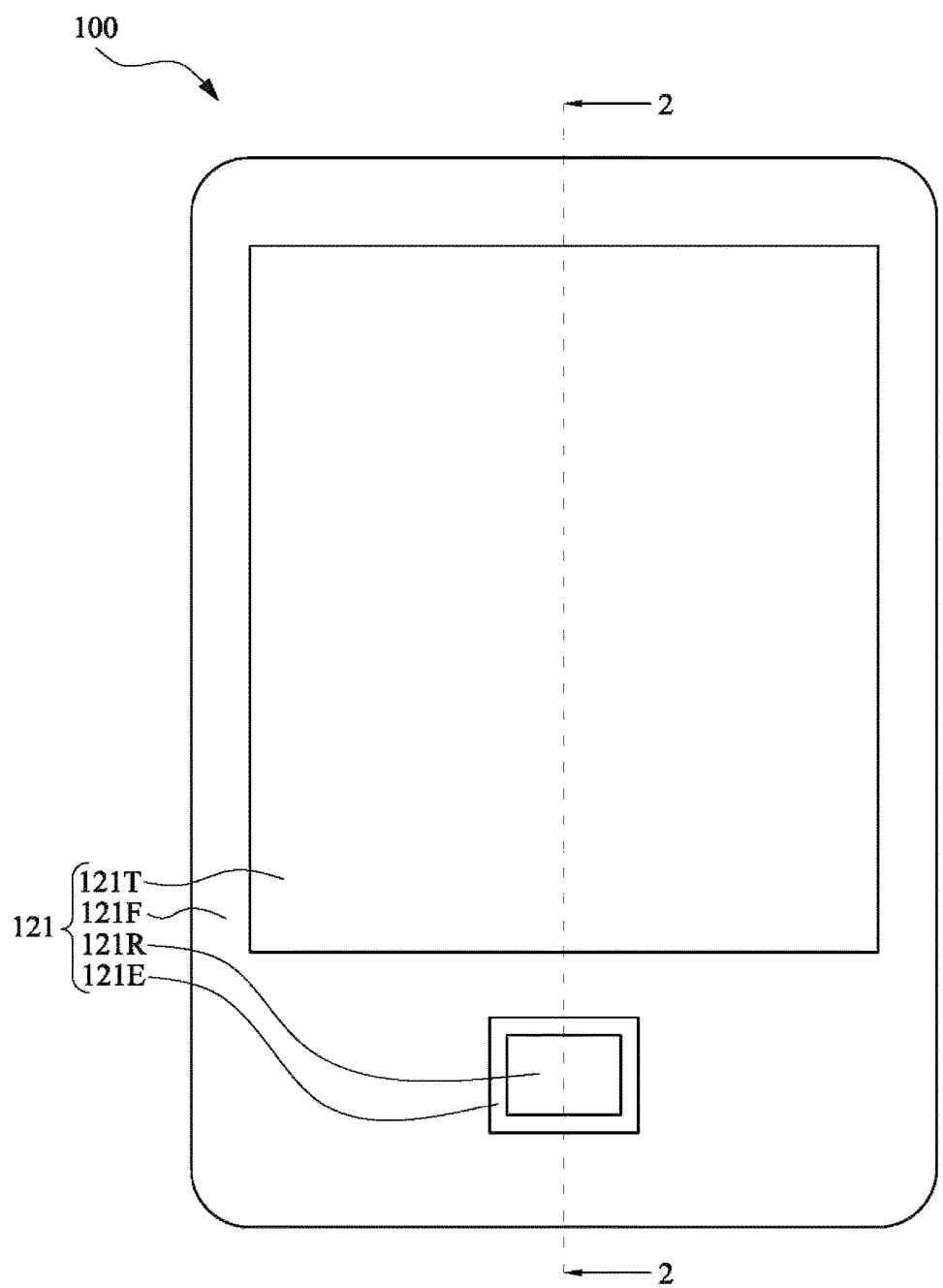
FIG. 1 is a schematic top view of a touch control device according to some embodiments of this disclosure.
Figure 2:
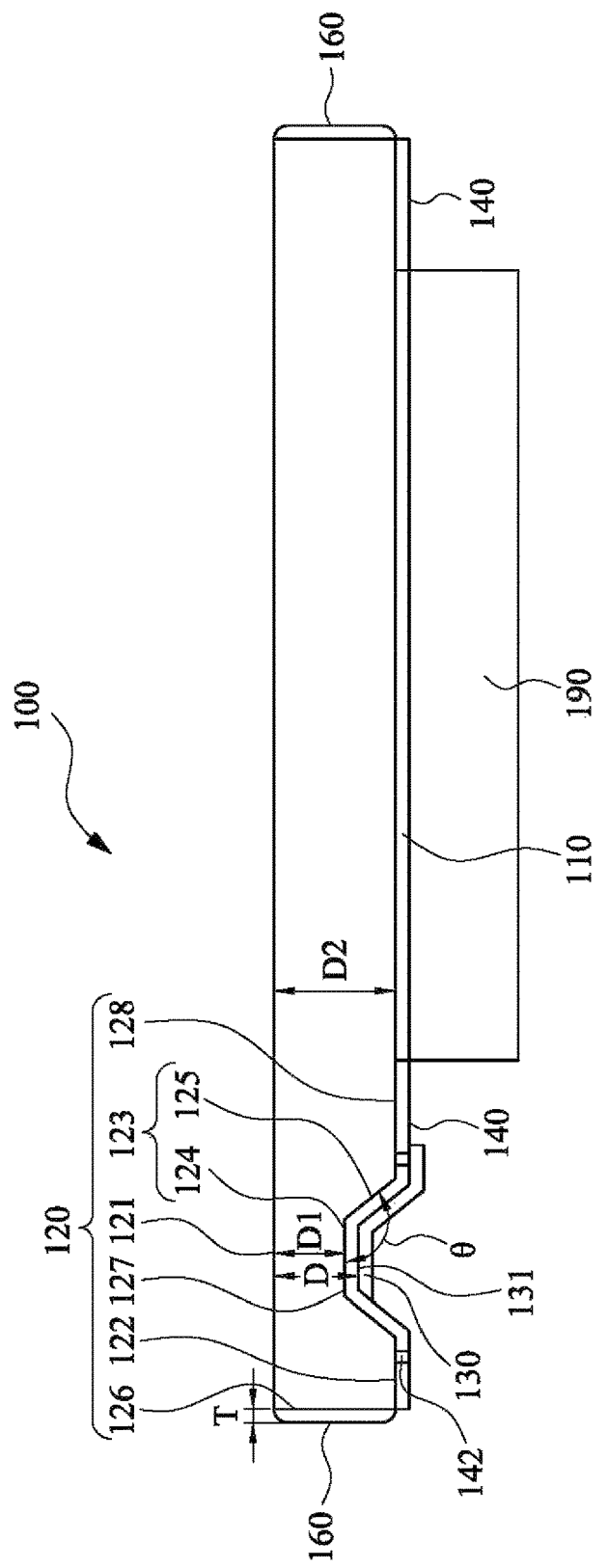
FIG. 2 is a cross-sectional view viewed along line 2 of FIG. 1 according to some embodiments of this disclosure.

FIG. 1 is a schematic top view of a touch control device 100 according to some embodiments of this disclosure. FIG. 2 is a cross-sectional view viewed along line 2 of FIG. 1 according to some embodiments of this disclosure. The touch control device 100 may be used in a mobile device such as a smart phone or a tablet.

As shown in FIG. 1 and FIG. 2, the touch control device 100 includes a touch sensing structure 110, a cover lens 120, and a fingerprint recognition structure 130. The cover lens 120 has a first surface 121 and a second surface 122 opposite to the first surface 121. The first surface 121 is a touch surface for touch operation. The touch sensing structure 110 is disposed on and in direct physical contact with the second surface 122 in some embodiments. The cover lens 120 has a groove 123. The groove 123 is cut into the second surface 122 and thus is disposed on the second surface 122, and the groove 123 has a top surface 124 and a side surface 125 adjacent to the top surface 124. The angle θ between the top surface 124 and the side surface 125 is greater than 90°. The groove 123 is depressed from the second surface 122 in toward the first surface 121. The fingerprint recognition structure 130 is at least partially disposed on and in direct physical contact with the top surface 124 of the groove 123 in some embodiments.

In order to ensure the sensitivity and accuracy of fingerprint recognition, the distance between the fingerprint recognition structure 130 and the first surface 121 should be small, such that the distance between the fingerprint recognition structure 130 and the touch object, such as a finger, is not too large. However, in order to ensure the strength and impact resistance of the cover lens 120, the thickness of the cover lens 120 should be large, so as to protect components such as touch sensing structure 110 disposed under the cover lens 120 from being damaged by external forces. Therefore, by disposing the groove 123 on the second surface 122 of the cover lens 120 and disposing the fingerprint recognition structure 130 in the groove 123, except the groove 123, the thickness of the cover lens 120 is large enough (in other words, the thickness D2 of the non-groove region 128 is greater than the thickness D1 of the groove region 127), such that the sensitivity and accuracy of fingerprint recognition and the strength of the touch control device 100 (or the strength of the cover lens 120) are all ensured.

Furthermore, in order to make the fingerprint recognition structure 130 more sensitive to detect the fingerprint applied on the cover lens 120, the minimum distance D between the top surface 131 of the fingerprint recognition structure 130 and the first surface 121 of the cover lens 120 may be in a range from 50 μm to 450 μm. In some embodiments, the minimum distance D may be in a range from 80 μm to 400 μm. The top surface 131 of the fingerprint recognition structure 130 is the surface of the fingerprint recognition structure 130 near the top surface 124 of the groove 123. In addition, some functional layer may be disposed on the first surface 121 of the cover lens 120. In some embodiments, the functional layer is an antireflection layer, anti-glare layer, or anti-reflective coating. When other functional layers are disposed on the first surface 121, the minimum distance D should be the minimum distance between the surface the touch object actually touches and the top surface 131 of the fingerprint recognition structure 130, i.e., the minimum distance between the outer surface of the functional layer away from the cover lens 120 and the fingerprint recognition structure 130.

Because the angle θ between the top surface 124 and the side surface 125 is greater than 90°, the side surface 125 is an inclined surface connected to the top surface 124 and the second surface 122. About the machining of the cover lens 120, especially when the cover lens 120 is made of a material having high hardness such as glass, the groove 123, which has inclined side surface, is more easy to be formed on the second surface 122 compared to cubic groove. Therefore, the situation that the connection of the side surface 125 and the second surface 122 is damaged can be reduced. Therefore, the yield of the cover lens 120 can be effectively enhanced. If the angle θ is greater, it is easier to machine the groove 123, and a mask layer or other components are more easily formed on the side surface 125 of the groove 123. However, the strength of the cover lens 120 is also influenced by the angle θ, so it is very important to determine the suitable value of the angle θ. In some embodiments, the angle θ between the top surface 124 and the side surface 125 is in a range from 95° to 175° or in a range from 110° to 165°, for example, 120°, 130°, or 140°. The scope of the present disclosure is not limited thereto. People having ordinary skill in the art can make proper modifications to the angle θ between the top surface 124 and the side surface 125 and the shape of the groove 123 depending on the actual application.

In some embodiments, the side surface 125 is a planar surface. Embodiments of this disclosure are not limited thereto. In other embodiments, the side surface 125 may be a concave curved surface or a convex curved surface. When the side surface 125 is a curved surface, the angle between the top surface 124 and the side surface 125 is defined to be an angle between the top surface and a line connecting one end of the side surface 125 connected to the top surface and one end of the side surface 125 connected to the second surface 122.

In some embodiments, the fingerprint recognition structure 130 is a capacitive touch sensing structure. Specifically, the fingerprint recognition structure 130 is a sensing electrode structure disposed in the groove 123 and on a part of the second surface 122. More specifically, the fingerprint recognition structure 130 is disposed on the top surface 124 and the side surface 125 of the groove 123 and the part of the second surface 122 connecting the side surface 125. The fingerprint recognition structure 130 disposed on the top surface 124 of the groove 123 is used to identify user's fingerprint. The fingerprint recognition structure 130 disposed on the side surface 125 of the groove 123 is used to connect the fingerprint recognition structure 130 disposed on the top surface 124 of the groove 123 and the fingerprint recognition structure 130 disposed on the part of the second surface 122.

For example, the fingerprint recognition structure 130 may be formed by depositing a conductive layer on the top surface 124 and the side surface 125 of the groove 123 and the part of the second surface 122 connected to the side surface 125 (at this time, the cover lens 120 is turned upside down compared to FIG. 2, and the groove 123 faces upward) and then patterning the conductive layer to form the fingerprint recognition structure 130.

Because the side surface 125 of the groove 123 forms an inclined surface connected to the top surface 124 and the second surface 122, the conductive layer is easier to be formed on the side surface 125 of the groove 123, and the patterning is easier to be performed. In addition, because the side surface 125 of the groove 123 has a moderate slope, fractures are less likely to be generated in the sensing electrode structure of the fingerprint recognition structure 130 disposed on the connection of top surface 124 and the side surface 125 or the connection of the side surface 125 and the second surface 122.

In some embodiments, the touch control device 100 further includes a display module 190 disposed under the touch sensing structure 110. Therefore, the touch sensing structure 110 and the display module 190 cooperatively perform touch and display. The display module 190 may be a display module which can be combined with the touch sensing structure, such as a liquid crystal display module (LCM) or an organic light-emitting diode (OLED).

In some embodiments, the touch sensing structure 110 is a single-layered touch sensing electrode structure formed on the cover lens 120. The touch sensing structure 110 may be made of metal nano-wires, transparent metal oxide film, metal mesh, etc.

In the associated manufacturing processes, the touch sensing structure 110 is first formed on the second surface 122. At this time, the cover lens 120 is turned upside down compared to FIG. 2, so the second surface 122 is the top surface. Then, the cover lens 120 and the touch sensing structure 110 are disposed on the display module 190.

In some embodiments, touch control device 100 further includes a mask layer 140 covering the top surface 124 and the side surface 125 of the groove 123 and a part of the second surface 122. Therefore, as shown in FIG. 1, when the touch control device 100 is viewed from above, the first surface 121 can be divided into a touch display region 121T and a frame region 121F. Specifically, as shown in FIG. 1 and FIG. 2, an orthogonal projection of the frame region 121F on the second surface 122 is the part of the second surface 122 covered by the mask layer 140, and an orthogonal projection of the touch display region 121T on the second surface 122 is the part of the second surface 122 on which the touch sensing structure 110 is disposed. Correspondingly, the display module 190 corresponds to the touch display region 121T as well.

The mask layer 140 is made of opaque ink, photoresist, etc., such that a frame is represented in the touch control device 100 to cover some opaque components disposed under the cover lens 120, for example, flexible circuit boards and conductive traces. The mask layer 140 may be a single-layered structure or a multiple-layered structure stacked by multiple materials. The thickness of the mask layer 140 is equal to or less than 20 μm, or the thickness of the mask layer 140 is in a range from 3 μm to 20 μm. Embodiments of this disclosure are not limited thereto. People having ordinary skill in the art can make proper modifications to the mask layer 140 depending on actual applications.

In some embodiments, the mask layer 140 is formed on the top surface 124 of the groove 123 and the second surface 122 by coating and then patterning (photolith etching) or screen printing.

About the coating processes, first the mask layer 140 is coated on the top surface 124 of the groove 123 and the second surface 122 (at this time, the cover lens 120 is turned upside down compared to FIG. 2, the second surface 122 is the top surface, and the groove 123 faces upward). Then, the patterning is performed, and the mask layer 140 covering the orthogonal projection of the touch display region 121T on the second surface 122 is removed. Therefore, the mask layer 140 can be evenly formed on the top surface 124 of the cover lens 120 and the part of the second surface 122 corresponding to the frame region 121F.

After the mask layer 140 is formed on the top surface 124 of the groove 123 and the part of the second surface 122 corresponding to the frame region 121F, the mask layer 140 is also formed on the side surface 125 of the cover lens 120. The mask layer 140 may be formed on the side surface 125 of the cover lens 120 by inkjet printing or pad printing.

Because the angle θ between the top surface 124 and the side surface 125 is greater than 90°, the side surface 125 will be an inclined surface connected to the top surface 124 and the second surface 122. The mask layer 140 can be directly formed on the side surface 125 by inkjet printing or pad printing. Therefore, the situations that the mask layer 140 cannot be formed on the side surface 125 and the mask layer 140 cannot be evenly formed on the side surface 125 will not happen, and the mask layer 140 can perform the covering function well.

The color of the mask layer 140 is black or white. Embodiments of this disclosure are not limited thereto. People having ordinary skill in the art can make proper modifications to the color of the mask layer 140 depending on the actual application.

In addition, the mask layer 140 is disposed between the cover lens 120 and the fingerprint recognition structure 130. In other words, the mask layer 140 is first formed on the cover lens 120, and then the fingerprint recognition structure 130 is disposed on the mask layer 140.

In some embodiments, the cover lens 120 further has a side surface 126 connected to the first surface 121 and the second surface 122 (i.e., the first surface 121 and the second surface 122 are respectively the top surface and the bottom surface of the cover lens 120, and the side surface 126 is located between the first surface 121 and the second surface 122). The touch control device 100 further includes a buffer layer 160 disposed on the side surface 126. Specifically, the buffer layer 160 is made of adhesive glue. More specifically, the adhesive glue is glue with fluidity and viscosity, and the adhesive glue is mainly made of acrylic, which is liquid at room temperature (e.g. 20-27° C.) and can be cured through ultraviolet light. The liquid adhesive glue can be formed on the side surface 126 by injection molding, glue stick, spray, roller coating, etc. The viscosity of the adhesive glue may be in a range from 500 mPa·s to 1200 mPa·s, the hardness of the cured adhesive glue may be in a range from 60 D to 90 D (Shore hardness), and the maximum distance between the side surface 126 of the cover lens 120 and the outer surface of the buffer layer 160 (the outer surface of the buffer layer 160 is the surface away from the side surface 126), i.e., the maximum thickness of the buffer layer, is in range from 0.03 mm to 0.2 mm or in a range from 0.08 mm to 0.12 mm. Therefore, the buffer layer 160 can buffer external forces, so as to protect the cover lens 120. Moreover, because micro cracks or gaps may be generated on the side surface 126 when the cover lens 120 is machined, the liquid buffer layer 160 can fill the micro cracks or the gaps on the side surface 126 due to capillary action, so as to repair the micro cracks and the gaps and enhance the strength of the cover lens 120. Further, by adopting the aforementioned adhesive glue to form the buffer layer, the buffer layer 160 will become compact and firmly bound to the side surface 126, so as to enhance the impact resistance and the anti-cracking ability, further enhancing the strength of the cover lens 120 and even the entire strength of the touch control device 100. Especially for the OGS, the impact resistance and the anti-cracking ability of the touch control device 100 can be effectively enhanced.

In some embodiments, the cover lens 120 is made of transparent material with high hardness. For example, the cover lens 120 may be made of tempered glass, sapphire, or polymethylmethacrylate (PMMA). The first surface 121 and the second surface 122 of the cover lens 120 are surfaces physically strengthened or chemically strengthened. Further, the side surface 126 of the cover lens 120 may also be a surface physically strengthened or chemically strengthened, so as to enhance the strength of the cover lens 120. The first surface 121 and/or the second surface 122 may also be a curved surface, so that the cover lens 120 forms a three-dimensional structure cover lens.

As shown in FIG. 1 and FIG. 2, the first surface 121 may be further divided into the touch display region 121T, the frame region 121F, and the fingerprint recognition region 121R. Specifically, an orthogonal projection of the groove 123 on the first surface 121 is the fingerprint recognition region 121R, and an orthogonal projection of the top surface 124 on the first surface 121 at least partially overlaps the fingerprint recognition region 121R. In addition, an orthogonal projection of the fingerprint recognition structure 130 on the first surface 121 does not overlap an orthogonal projection of the touch sensing structure 110 on the first surface 121.

In some embodiments, the shape of the fingerprint recognition region 121R is a rectangle. Embodiments of this disclosure are not limited thereto. In other embodiments, the shape of the fingerprint recognition region 121R may be a diamond, a round, or an oval.

The touch control device 100 further includes patterned covering layer 142 disposed on the second surface and surrounding the groove 123. The color of the mask layer 140 is different from the color of the patterned covering layer 142. For example, the color of the mask layer 140 is black, and the color of the patterned covering layer 142 is red or blue. Therefore, the first surface 121 may further include a mark region 121E, so as to mark the position of the fingerprint recognition region 121R clearly. An orthogonal projection of the patterned covering layer 142 on the first surface 121 is the mark region 121E.

In the associated manufacturing processes, first the mask layer 140 is formed on the second surface 122, and then the part of the mask layer 140 corresponding to the mark region 121E is removed to form a hollow structure. Subsequently, the patterned covering layer 142 is formed on the region of the second surface 122 corresponding to the mark region 121E.

Figure 3:
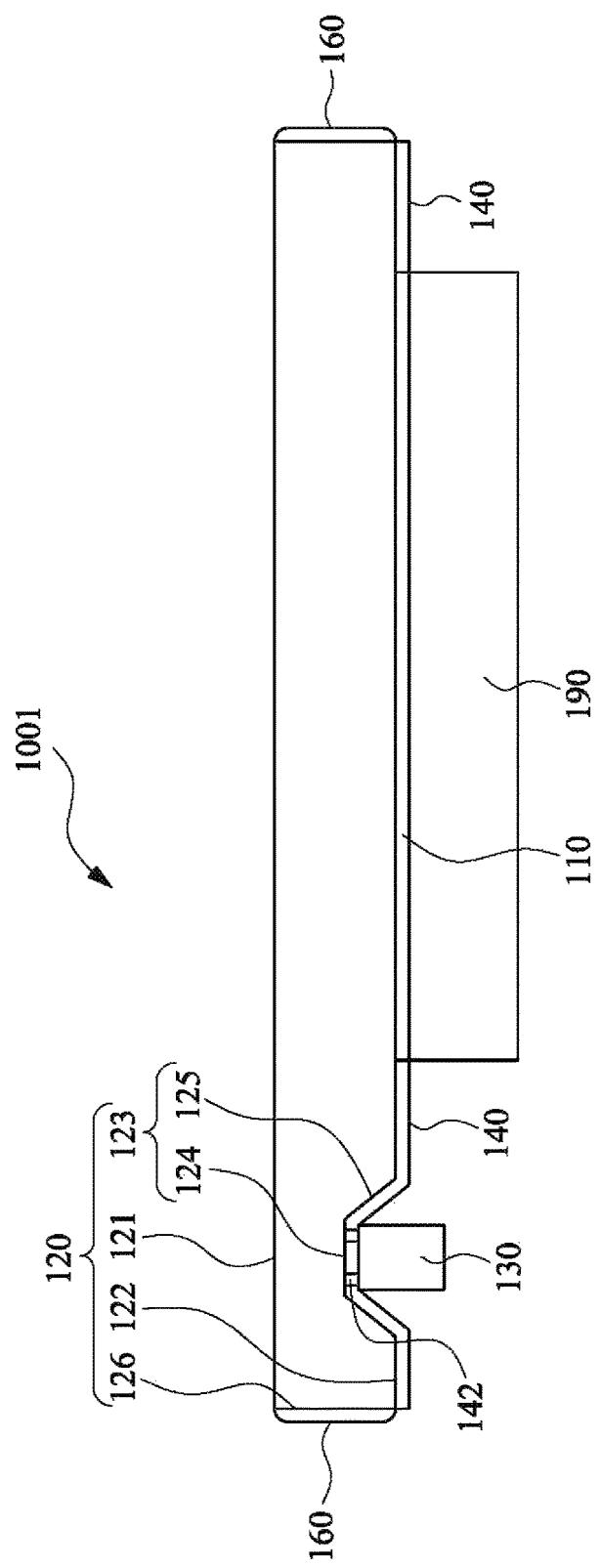
FIG. 3 is a cross-sectional view according to other embodiments of this disclosure.

FIG. 3 is a cross-sectional view according to other embodiments of this disclosure. As shown in FIG. 3, the embodiment is similar to the aforementioned embodiment, and the differences are described below.

The fingerprint recognition structure 130 is an integrated circuit chip disposed under the top surface 124 of the groove 123 and directly contacts the mask layer 140 covering the top surface 124 of the groove 123. Embodiments of this disclosure are not limited thereto. People having ordinary skill in the art can make proper modifications to the fingerprint recognition structure 130 depending on the actual application.

In some embodiments, the mask layer 140 is made of adhesive material with light shading function. Therefore, the covering 140 can not only cover components under the cover lens 120 but also fix the fingerprint recognition structure 130 in the groove 123 of the cover lens 120.

In other embodiments, the fingerprint recognition structure 130 may not be fixed in the groove 123 of the cover lens 120 by the mask layer 140. The fingerprint recognition structure 130 may be fixed in the groove 123 of the cover lens 120 by disposing auxiliary components. Alternatively, the size or the shape of the groove 123 may be specially designed, such that the fingerprint recognition structure 130 is engaged in the groove 123 of the cover lens 120.

As shown in FIG. 1 and FIG. 3, the touch control device 1001 further includes a patterned covering layer 142 disposed on the top surface 124 of the groove 123. The color of mask layer 140 is different from the color of the patterned covering layer 142. For example, the color of the mask layer 140 is black, and the color of the patterned covering layer 142 is red or blue. Therefore, the first surface 121 may further include a mark region 121E, so as to mark the position of the fingerprint recognition region 121R clearly. An orthogonal projection of the patterned covering layer 142 on the first surface 121 is the mark region 121E.

It is noted that the patterned covering layer 142 may be disposed on the second surface 122. However, because this configuration is similar to the aforementioned embodiments, details are not described here.

Figure 4:
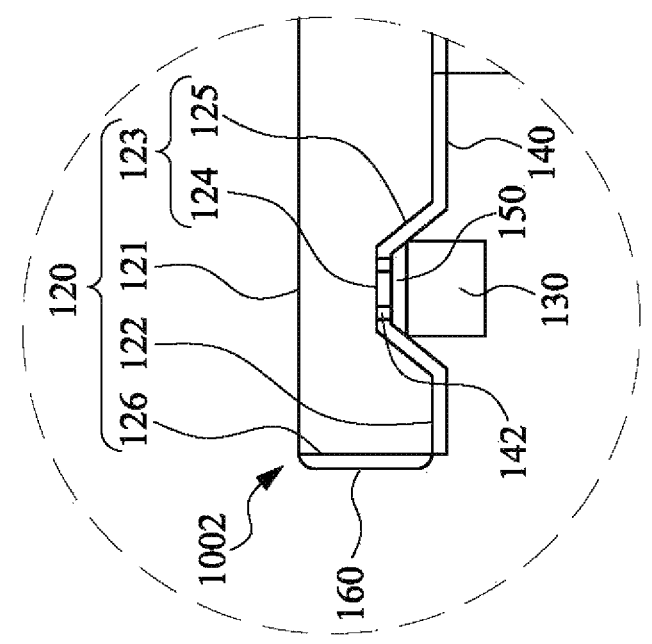
FIG. 4 is a partial cross-sectional view according to other embodiments of this disclosure.

FIG. 4 is a partial cross-sectional view according to other embodiments of this disclosure. As shown in FIG. 4, this embodiment is similar to the embodiment of FIG. 3, and the differences are described below.

In some embodiments, the mask layer 140 only has the covering function. The touch control device 1002 further includes a first fixing layer 150 disposed between the fingerprint recognition structure 130 and the mask layer 140 covering the top surface 124 of the groove 123, so as to fix the fingerprint recognition structure 130 in the groove 123 of the cover lens 120.

The first fixing layer 150 may be made of glue with viscosity, for example, optical glue or adhesive glue. More specifically, the adhesive glue is mainly made of acrylic, which is liquid at room temperature and can be cured through ultraviolet light. The liquid adhesive glue can be formed between the fingerprint recognition structure 130 and the mask layer 140 by injection molding, glue stick, spray, roller coating, etc., and after the curing, the first fixing layer 150 tightly and stably bounds the fingerprint recognition structure 130 and the mask layer 140. The viscosity of the adhesive glue may be in a range from 500 mPa·s to 1200 mPa·s, and the hardness of the cured adhesive glue may be in a range from 60 D to 90 D (Shore hardness). The thickness of the first fixing layer 150 equals to or is less than 50 µm, or the thickness of the first fixing layer 150 is in a range from 3 µm to 30 µm. In order to further enhance the sensitivity of the fingerprint recognition, the thickness of the first fixing layer 150 may equals to or less than 10 µm. The first fixing layer 150 may further strengthen the strength of the structure around the groove 123 of the cover lens 120, especially when the aforementioned adhesive glue is used to form the first fixing layer 150. Specifically, the viscosity and the hardness of the aforementioned adhesive glue can further strengthen the strength of the structure around the groove 123 of the cover lens 120.

Figure 5:
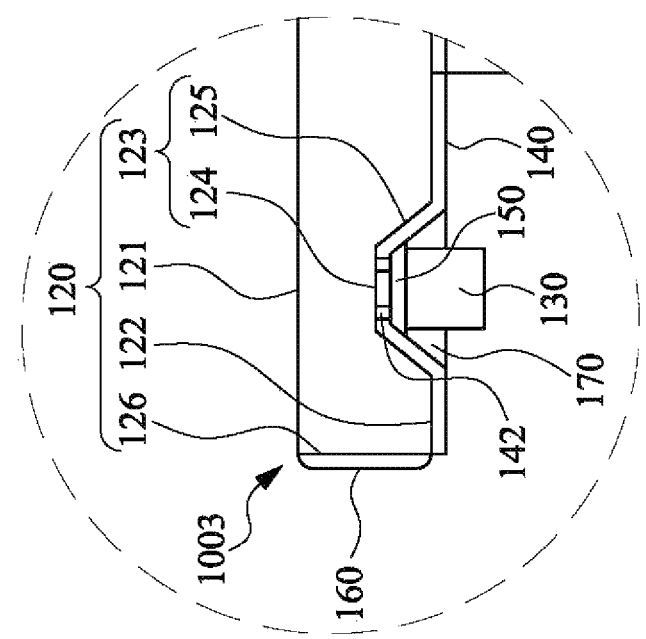
FIG. 5 is a partial cross-sectional view according to other embodiments of this disclosure.

FIG. 5 is a partial cross-sectional view according to other embodiments of this disclosure. As shown in FIG. 5, this embodiment is similar to the embodiment of FIG. 4, and the differences are described below.

As shown in FIG. 5, the touch control device 1003 further includes a second fixing layer 170 disposed between the fingerprint recognition structure 130 and the mask layer 140 covering the side surface 125 of the groove 123, and the second fixing layer 170 fills the groove 123, such that the fingerprint recognition structure 130 is fixed in the groove 123 of cover lens 120.

The second fixing layer 170 is made of glue with viscosity, such as optical glue or adhesive glue. The material and forming method of the second fixing layer 170 are similar to the first fixing layer 150, so the details are not described here. The second fixing layer 170 and the first fixing layer 150 can be integrally disposed between the fingerprint recognition structure 130 and the mask layer 140 disposed on the top surface 124 and the side surface 125 of the groove 123.

Because the cured second fixing layer 170 can tightly and stably bound the fingerprint recognition structure 130 and the mask layer 140 and makes no gaps between the groove 123 and the finger recognition structure 130, the second fixing layer 170 can stably fix the fingerprint recognition structure 130 in the groove 123 and further strengthen the strength of the structure around the groove 123 of the cover lens 120.

Figure 6:
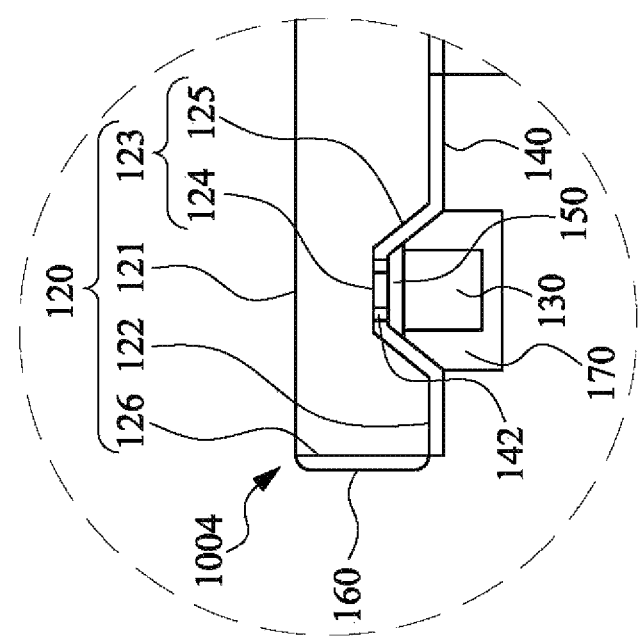
FIG. 6 is a partial cross-sectional view according to other embodiments of this disclosure.

FIG. 6 is a partial cross-sectional view according to other embodiments of this disclosure. As shown in FIG. 6, the touch control device 1004 is similar to the touch control device 1003 of FIG. 5, and the main difference is that, the second fixing layer 170 is disposed between the fingerprint recognition structure 130 and the mask layer 140 covering the side surface 125 of the groove 123, and the second fixing layer 170 further covers the fingerprint recognition structure 130. Therefore, the second fixing layer 170 also can buffer external forces, so as to protect the fingerprint recognition structure 130 and reduce the damage and the scratch of the fingerprint recognition structure 130 due to external forces in the subsequent processes.

Figure 7:
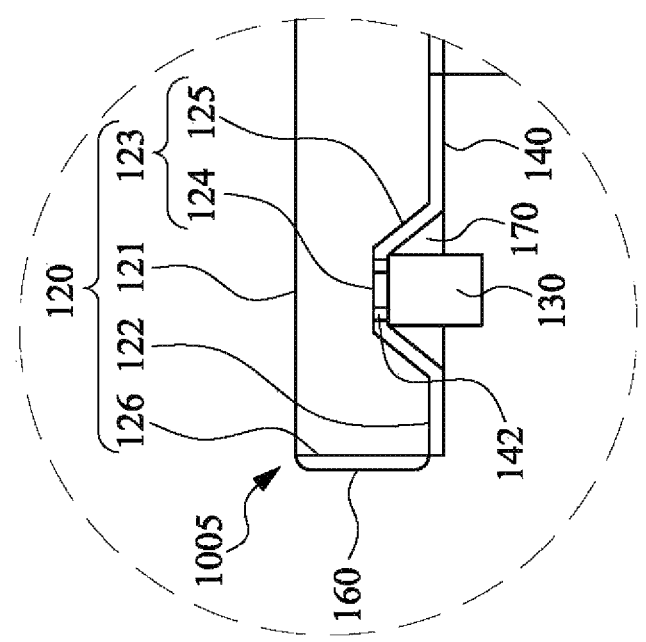
FIG. 7 is a partial cross-sectional view according to other embodiments of this disclosure.

FIG. 7 is a partial cross-sectional view according to other embodiments of this disclosure. As shown in FIG. 7, the touch control device 1005 is similar to the touch control device 1003 of FIG. 5, and the main differences is that, in the embodiment, the fingerprint recognition structure 130 directly contacts the mask layer 140 covering the top surface 124 of the groove 123. In other words, the first fixing layer 150 is not disposed between the fingerprint recognition structure 130 and the top surface 124, and the finger recognition structure 130 is fixed to the groove 123 by the second fixing layer 170. In addition, similar to the second fixing layer 170 of FIG. 6, the second fixing layer 170 may further cover the side surface and the bottom surface of the fingerprint recognition structure 130.

Because the fingerprint recognition structure 130 directly contacts the mask layer 140 covering the top surface 124 of the groove 123, the distance between the fingerprint recognition structure 130 and the first surface 121 is reduced, such that the sensitivity and accuracy of the fingerprint recognition are further enhanced.

Figure 8:
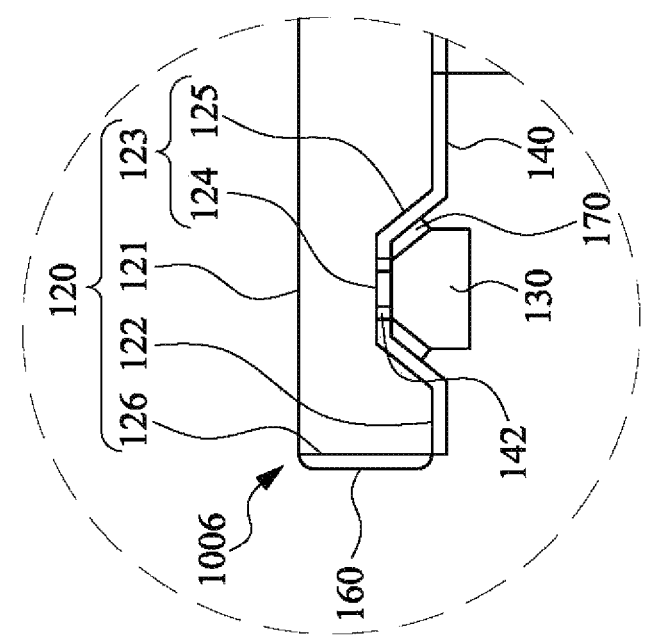
FIG. 8 is a partial cross-sectional view according to other embodiments of this disclosure.

FIG. 8 is a partial cross-sectional view according to other embodiments of this disclosure. As shown in FIG. 8, the touch control device 1006 is similar to the touch control device 1001 of FIG. 3, and the main differences are described below.

In some embodiments, the mask layer 140 only has the covering function. The touch control device 1006 further includes a second fixing layer 170. The fingerprint recognition structure 130 is disposed on the side surface 125 through the second fixing layer 170, and the fingerprint recognition structure 130 directly contacts the mask layer 140 covering the top surface 124 of the groove 123. In other words, the second fixing layer 170 is disposed between the fingerprint recognition structure 130 and the mask layer 140 covering the side surface 125 of the groove 123, and the second fixing layer 170 is disposed only on the mask layer 140 covering the side surface 125 of the groove 123 and does not fill the groove 123.

In some embodiments, the second fixing layer 170 is made of glue with viscosity, such as optical glue or adhesive glue. The material and forming method of the second fixing layer 170 are similar to the first fixing layer 150, so the details are not described here.

Because the cured second fixing layer 170 can tightly and stably bound the fingerprint recognition structure 130 and the mask layer 140, the second fixing layer 170 can stably fix the fingerprint recognition structure 130 in the groove 123. In addition, because the second fixing layer 170 has enough hardness and is disposed in the groove 123, the second fixing layer 170 can strengthen the strength of the structure around the groove 123 of the cover lens 120.

Figure 9:
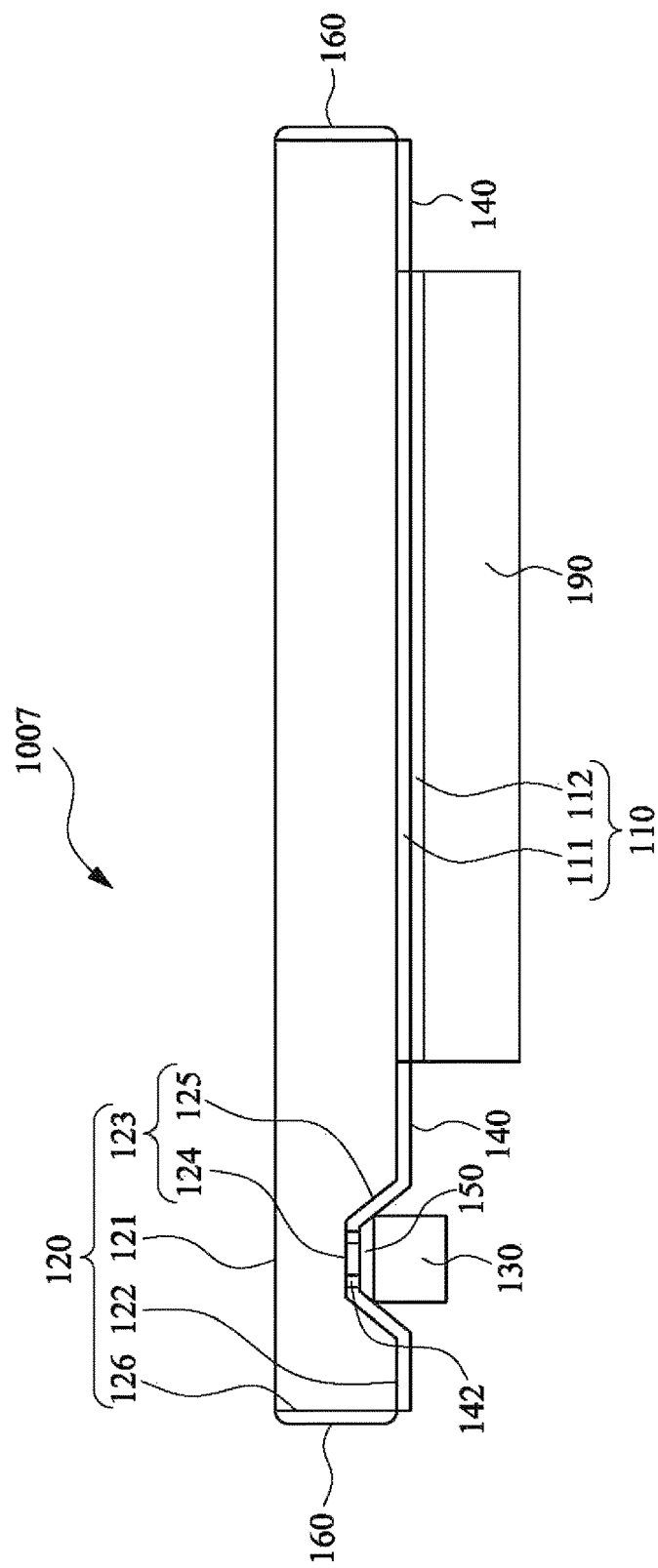
FIG. 9 is a cross-sectional view according to other embodiments of this disclosure.

FIG. 9 is a cross-sectional view according to other embodiments of this disclosure. As shown in FIG. 9, the touch control device 1007 is similar to the touch control device 1002 of FIG. 4, and the main differences are described below.

In some embodiments, touch sensing structure 110 includes a substrate 111 and a touch sensing layer 112 disposed on one side of the substrate 111 (the touch sensing layer 112 is disposed on one surface of the substrate 111). The substrate 111 is disposed between the cover lens 120 and the touch sensing layer 112. In addition, the touch sensing layer 112 may be a single-layered touch sensing electrode structure.

In associated manufacturing processes, first the touch sensing layer 112 is formed on the substrate 111. Then, the substrate 111 with the touch sensing layer 112 is bonded to the second surface 122 via one sides of the substrate 111 and located in the touch display region 121T. Then, the display module 190 is bonded to the touch sensing layer 112.

Figure 10:
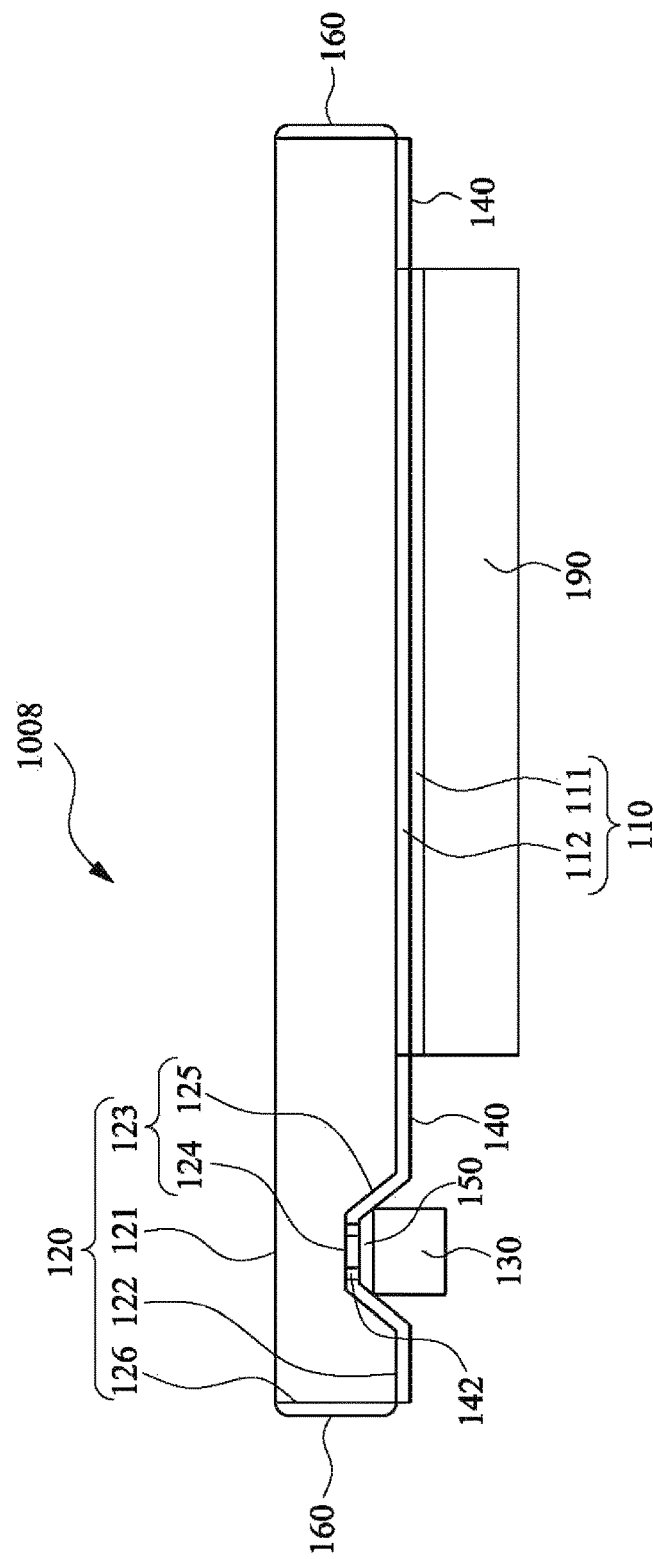
FIG. 10 is a cross-sectional view according to other embodiments of this disclosure.

FIG. 10 is a cross-sectional view according to other embodiments of this disclosure. As shown in FIG. 10, the touch control device 1008 is similar to the touch control device 1007 of FIG. 9, and the main difference is that, in this embodiment, the touch sensing layer 112 is disposed on the substrate 111 and between the cover lens 120 and the substrate 111.

In associated manufacturing processes, first the touch sensing layer 112 is formed on the substrate 111. Then, the substrate 111 with the touch sensing layer 112 is bonded to the second surface 122 via one side of the touch sensing layer 112. Then, the display module 190 is bonded to the substrate 111.

Figure 11:
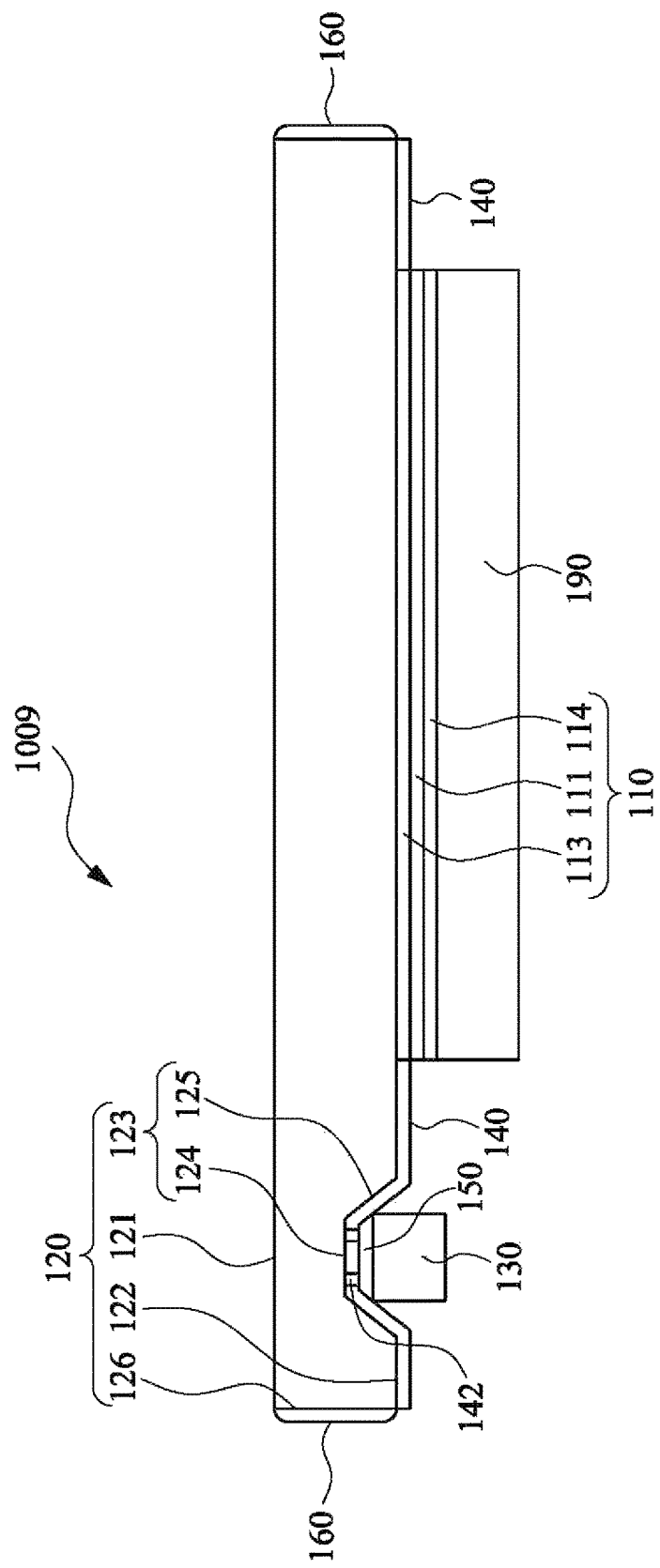
FIG. 11 is a cross-sectional view according to other embodiments of this disclosure.

FIG. 11 is a cross-sectional view according to other embodiments of this disclosure. As shown in FIG. 11, the touch control device 1009 is similar to the touch control device 1002 of FIG. 4, and the main differences are described below.

In some embodiments, the touch sensing structure 110 includes a substrate 111, an upper touch sensing layer 113, and a lower touch sensing layer 114. The upper touch sensing layer 113 and the lower touch sensing layer 114 are respectively disposed on two sides of the substrate 111. The upper touch sensing layer 113 is disposed between the cover lens 120 and the substrate 111.

In associated manufacturing processes, first the upper touch sensing layer 113 and the lower touch sensing layer 114 are respectively formed on two sides of the substrate 111. Then, the upper touch sensing layer 113 is bonded to the second surface 112. Then, the display module 190 is bonded to the lower touch sensing layer 114.

The electrodes of the upper touch sensing layer 113 are staggered with the electrodes of the lower touch sensing layer 114. For example, the electrodes of the upper touch sensing layer 113 may be in the vertical direction, and the electrodes of the lower touch sensing layer 114 may be in the horizontal direction. The electrodes of the upper touch sensing layer 113 may be driving traces, and the electrodes of the lower touch sensing layer 114 may be receiving traces. Alternatively, the electrodes of the upper touch sensing layer 113 may be receiving traces, and the electrodes of the lower touch sensing layer 114 may be driving traces.

Figure 12:
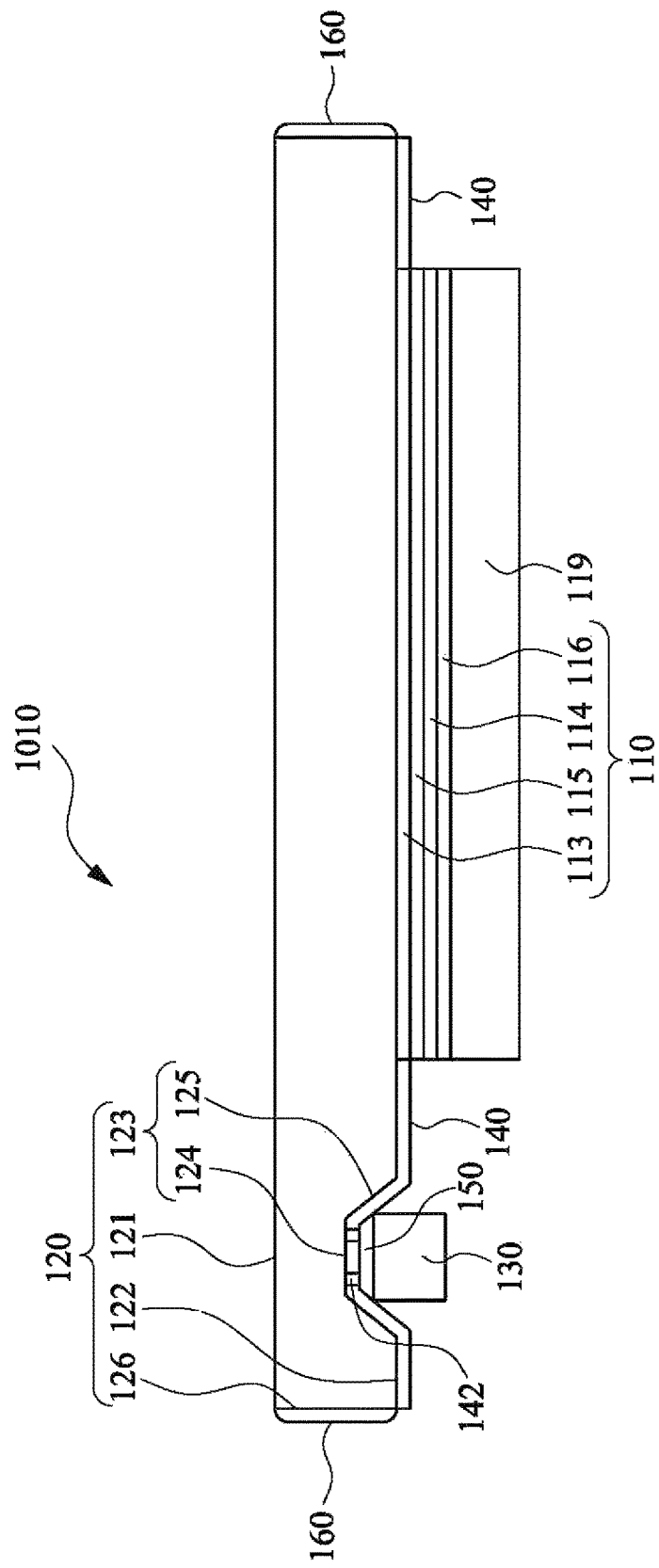
FIG. 12 is a cross-sectional view according to other embodiments of this disclosure.

FIG. 12 is a cross-sectional view according to other embodiments of this disclosure. As shown in FIG. 12, the touch control device 1010 is similar to the touch control device 1009 of FIG. 11, and the main differences are described below.

In some embodiments, the touch sensing structure 110 includes an upper touch sensing layer 113, a lower touch sensing layer 114, an upper substrate 115, and a lower substrate 116. The lower touch sensing layer 114 is disposed on the lower substrate 116, and the upper touch sensing layer 113 is disposed on the upper substrate 115. The upper substrate 115 is disposed between the upper touch sensing layer 113 and the lower touch sensing layer 114, and the upper touch sensing layer 113 is disposed between the cover lens and the upper substrate 115.

In associated manufacturing processes, first the upper touch sensing layer 113 is formed on one side of the upper substrate 115, and the lower touch sensing layer 114 is formed on one side of the lower substrate 116. Then, the upper touch sensing layer 113 is bonded to the second surface 122, and the lower touch sensing layer 114 is bonded to the upper substrate 115. Then, the display module 190 is bonded to the lower substrate 116.

Embodiments of this disclosure are not limited thereto. In other embodiments, the positions of the upper touch sensing layer 113 and the upper substrate 115 may be interchanged, and the positions of the lower touch sensing layer 114 and the lower substrate 116 may be interchanged, as long as the upper touch sensing layer 113 is insulated from the lower touch sensing layer 114.

As shown in FIG. 9 to FIG. 12, the substrate 111, the upper substrate 115, and the lower substrate 116 are all made of transparent insulating material, such as glass or plastic film, in which plastic film may include polyimide (PI), polypropylene (PP), polystyrene (PS), acrylonitrile-butadiene-styrene (ABS), polyethylene terephthalate (PET), polyvinyl chloride (PVC), polycarbonate (PC), polyethylene (PE), polymethyl methacrylate (PMMA), polytetrafluoroethylene (PTFE), etc. The touch sensing layer 112, the upper sensing layer 113, and the lower touch sensing layer 114 are all made of conductive material with high light transmittance, such as metal nano-wires, transparent metal oxide film, or metal mesh.

In addition, in some embodiments, the touch control device 100 may further include a metal ring disposed in the groove 123 and surrounding the fingerprint recognition structure 130 (not shown in Figures), which may be used to detect touch objects, activate the fingerprint recognition structure 130, and improve the signal to noise ratio.

The signal to noise ration may be defined as the ratio of the power of a signal (meaningful information) and the power of background noise (unwanted signal). Embodiments of this disclosure are not limited thereto. The person having ordinary skill in the art can make proper modifications to the definition of the signal to noise ration depending on the actual application.

In the touch control device 100, by disposing the groove 123 in the cover lens 120 and disposing the fingerprint recognition structure 130 in the groove 123, the distance between the fingerprint recognition structure 123 and the touch object such as a finger can be reduced. At the same time, except the groove 123, the thickness of the cover lens 120 is large enough, such that, in addition to the sensitivity and accuracy of the fingerprint recognition structure 130 being enhanced, the strength of the cover lens 120 is also ensured.

Further, because the side surface 125 of the groove 123 is an inclined surface connected to the top surface 124 and the second surface 122, the groove 123 is easier to be machined on the second surface 122, such that the yield of the cover lens 120 can be effectively enhanced. In addition, because the side surface 125 of the groove 123 has a moderate slope, fractures are less likely to be generated in the sensing electrode structure of the fingerprint recognition structure 130 disposed on the connection of top surface 124 and the side surface 125 or the connection of the side surface 125 and the second surface 122. Finally, the mask layer 140 can be directly formed on the side surface 125 by inkjet printing or pad printing. Therefore, the situation that the mask layer 140 cannot be formed on the side surface 125 and the mask layer 140 cannot be evenly formed on the side surface 125 will not happen, so the mask layer 140 can perform the covering function well.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, 6th paragraph. In particular, the use of "step of" in the claims herein is not intended to invoke the provisions of 35 U.S.C. § 112, 6th paragraph.

What is claimed is:
1. A touch control device, comprising:
 a cover lens having a first surface and a second surface opposite to the first surface, wherein the first surface is a touch surface;

a groove disposed on the second surface and having a top surface and a side surface adjacent to the top surface, wherein an angle between the top surface and the side surface is greater than 90°;

a fingerprint recognition structure at least partially disposed on the top surface of the groove;

a touch sensing structure disposed on the second surface; and a mask layer covering the top surface and the side surface of the groove;

wherein the fingerprint recognition structure directly contacts the mask layer covering the top surface of the groove.

2. The touch control device of claim 1, wherein the angle between the top surface and the side surface is in a range from 95° to 175°.

3. The touch control device of claim 2, wherein the angle between the top surface and the side surface is in a range from 110° to 165°.

4. The touch control device of claim 1, wherein a surface of the fingerprint recognition structure near the top surface of the groove is a top surface of the fingerprint recognition structure, and a minimum distance between the top surface of the fingerprint recognition structure and the first surface of the cover lens is in a range from 50 μm to 450 μm.

5. The touch control device of claim 4, wherein the minimum distance between the top surface of the fingerprint recognition structure and the first surface of the cover lens is in a range from 80 μm to 400 μm.

6. The touch control device of claim 1, further comprising a second fixing layer disposed between the fingerprint recognition structure and the mask layer covering the side surface of the groove.

7. The touch control device of claim 1, wherein the fingerprint recognition structure is a sensing electrode structure.

8. The touch control device of claim 7, wherein the sensing electrode structure is disposed in the groove and on a part of the second surface.

9. The touch control device of claim 1, wherein the fingerprint recognition structure is an integrated circuit chip.

10. The touch control device of claim 1, wherein the touch sensing structure is a touch sensing electrode structure formed on the cover lens.

11. The touch control device of claim 1, wherein the cover lens further has a side surface connected to the first surface and the second surface; and further comprising:

a buffer layer disposed on the side surface connected to the first surface and the second surface.

12. The touch control device of claim 11, wherein a maximum distance between the side surface of the cover lens and an outer surface of the buffer layer is in range from 0.03 mm to 0.2 mm.

* * * * *